(12) United States Patent
Jain et al.

(10) Patent No.: US 9,041,562 B2
(45) Date of Patent: May 26, 2015

(54) CONTROLLING A VOICE SITE USING NON-STANDARD HAPTIC COMMANDS

(75) Inventors: Anupam Jain, Gurgaon (IN); Nitendra Rajput, New Delhi (IN); Simon N. Robinson, Swansea (GB)

(73) Assignee: International Business Machines Corporation, Armonk, NY (US)

( * ) Notice: Subject to any disclaimer, the term of this patent is extended or adjusted under 35 U.S.C. 154(b) by 836 days.

(21) Appl. No.: 13/196,161

(22) Filed: Aug. 2, 2011

(65) Prior Publication Data

US 2013/0033388 A1    Feb. 7, 2013

(51) Int. Cl.
*H04M 11/00* (2006.01)
*G06F 1/16* (2006.01)
*G06F 3/01* (2006.01)

(52) U.S. Cl.
CPC ............ *G06F 1/1684* (2013.01); *G06F 1/1626* (2013.01); *G06F 3/017* (2013.01); *G06F 2200/1636* (2013.01)

(58) Field of Classification Search
CPC .............................. G06F 1/1626; G06F 1/1684
USPC .............................. 379/88.13, 102.1; 704/275
See application file for complete search history.

(56) References Cited

U.S. PATENT DOCUMENTS

| | | | | |
|---|---|---|---|---|
| 5,883,680 A | * | 3/1999 | Nykerk | 348/734 |
| 6,820,056 B1 | * | 11/2004 | Harif | 704/275 |
| 6,948,129 B1 | * | 9/2005 | Loghmani | 715/751 |
| 7,039,165 B1 | * | 5/2006 | Saylor et al. | 379/88.18 |
| 2004/0230682 A1 | | 11/2004 | Immonen | |
| 2006/0066569 A1 | | 3/2006 | Eid et al. | |
| 2008/0144783 A1 | | 6/2008 | Kumar et al. | |
| 2008/0231524 A1 | * | 9/2008 | Zeiger et al. | 343/718 |
| 2009/0138262 A1 | | 5/2009 | Agarwal et al. | |
| 2009/0232287 A1 | | 9/2009 | Agarwal et al. | |
| 2011/0051911 A1 | | 3/2011 | Agarwal et al. | |
| 2011/0191696 A1 | * | 8/2011 | Jain et al. | 715/758 |
| 2011/0293078 A1 | * | 12/2011 | Saylor et al. | 379/88.13 |
| 2012/0253817 A1 | | 10/2012 | Trinh | |
| 2012/0323580 A1 | * | 12/2012 | Agarwal et al. | 704/275 |

FOREIGN PATENT DOCUMENTS

CN        1531312 A       9/2004

OTHER PUBLICATIONS

Agarwal et al., The World Wide Telecom Web Browser, ACM DEV'10, Dec. 17-18, 2010, pp. 1-9.
Agarwal et al., The Spoken Web: A Web for the Underprivileged, SIGWEB Newsletter Summer 2010, http://doi.acm.org/10.1145/1796390.1796391, pp. 1-9.
Ronkainen et al., Tap Input as an Embedded Interaction Method for Mobile Devices, TEI'07, Feb. 15-17, 2007, Chapter 6, Body Movements, pp. 263-270.

(Continued)

*Primary Examiner* — Benjamin C Lee
*Assistant Examiner* — Chico A Foxx
(74) *Attorney, Agent, or Firm* — Ryan, Mason & Lewis, LLP

(57) ABSTRACT

An apparatus and an article of manufacture for controlling a voice site using a haptic input modality include validating a haptic input from an instrument capable of accessing a voice site, processing the haptic input on a server to determine a voice site command corresponding to the haptic input, and processing the voice site command at the server to control an interaction with the voice site.

12 Claims, 3 Drawing Sheets

(56) References Cited

OTHER PUBLICATIONS

Linjama et al., Gesture Interfaces for Mobile Devices—Minimalist Approach for Haptic Interaction, CHI 2005, pp. 1-4.
Linjama et al., Novel, Minimalist Haptic Gesture Interaction for Mobile Devices, NordCHl 2004, pp. 457-458.
Harrison et al., Scratch Input: Creating Large, Inexpensive, Unpowered and Mobile Finger Input Surfaces, UIST 2008, pp. 205-208.
Misra et al., Microphone as Sensor in Mobile Phone Performance, NIME 2008, pp. 1-4.
Kansal et al., Building a Sensor Network of Mobile Phones, IPSN 2007, pp. 1-2.

* cited by examiner

CONTROLLING A VOICE SITE USING NON-STANDARD HAPTIC COMMANDS

FIELD OF THE INVENTION

Embodiments of the invention generally relate to information technology, and, more particularly, to voice sites.

BACKGROUND OF THE INVENTION

The World Wide Telecom Web (also referred to as Spoken Web) contains interconnected voice applications (called as VoiceSites or voice sites) that can be accessed by any regular phone. In conjunction with existing approaches, a voice site can support speech (spoken word) or dual tone multiple frequency (DTMF) as input modalities.

However, with DTMF, one is restricted to the number of digits on the phone, and remembering the mapping (digit to commands) can become tedious. Also, pressing digits may not be natural to a command (for example, scrolling the scroll bar on a website is more natural than pressing '1' to go down, '2' to go up, etc.). Similarly, with a speech input modality, remembering the mapping (words to commands) can become tedious, such techniques are language dependent, and one is restricted to speech recognition accuracy.

Consequently, a need exists for improved means for controlling a voice site through all kinds of phones, independent of the platform.

SUMMARY OF THE INVENTION

Principles and embodiments of the invention provide techniques for controlling a voice site using non-standard haptic commands. An exemplary method (which may be computer-implemented) for controlling a voice site using a haptic input modality, according to one aspect of the invention, can include steps of validating a haptic input from an instrument capable of accessing a voice site, processing the haptic input on a server to determine a voice site command corresponding to the haptic input, and processing the voice site command at the server to control an interaction with the voice site.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
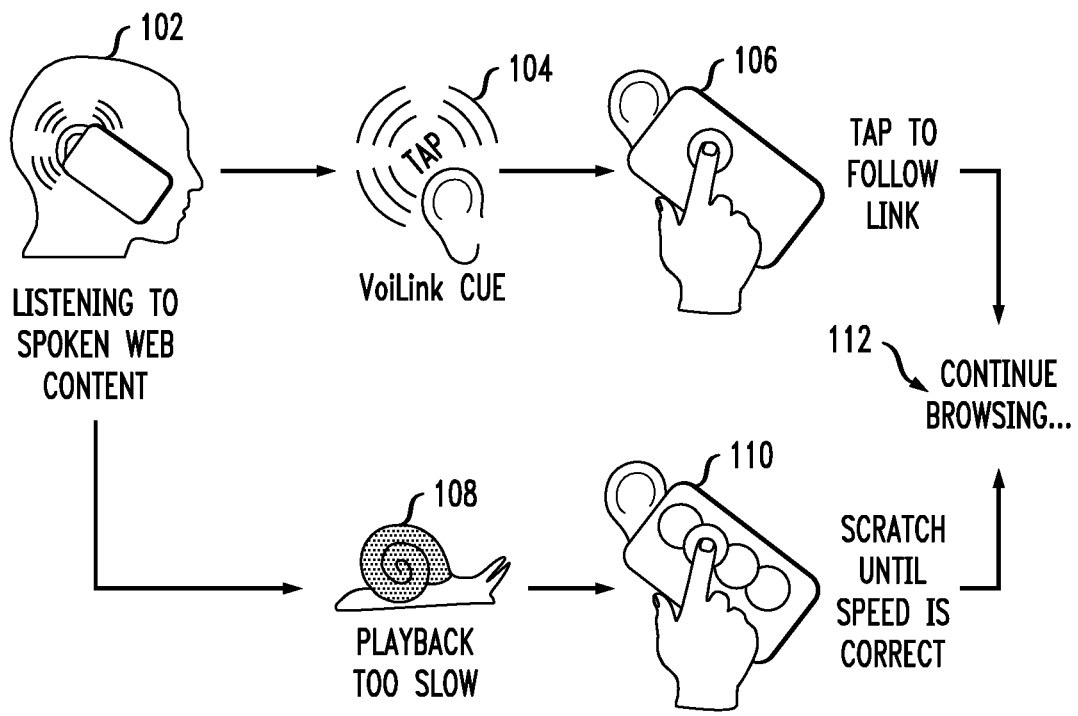
FIG. 1 is a diagram illustrating example haptic commands that can be given as input to a phone, translating to some control on a voice site on a server, according to an embodiment of the present invention.

Principles of the invention include controlling a voice site on a server using non-standard haptic commands. In one aspect of the invention, non-standard haptic input mechanisms such as tapping and/or scratching a phone instrument are used and sent to a server for processing, thereby controlling the voice site and/or its components. By way of example, the commands can be natural movements such as scratching a finger downwards to progress forward in a voice site. Accordingly, the input mechanisms detailed herein are easy for a user to remember, language independent and can be carried out from any phone (that is, no special feature is needed).

Additionally, the input mechanisms and commands can include the following examples: tapping the instrument being used to call to enable the voice signal produced to control the voice site on the server; scratching the instrument being used to call in upward direction to enable the voice signal produced to control the voice site on the server; and scratching the instrument being used to call in downward direction to enable the voice signal produced to control the voice site on the server. The sound produced by the tapping or scratching the device is processed as normal audio through the phone's microphone. When this audio reaches the server, it is filtered and processed (see, for example, FIG. 2) to determine if it is a valid haptic input. After the validation, the input is processed to invoke the corresponding voice site command mapped for that haptic input.

One aspect of the invention also includes controlling voice site volume, tempo of the audio, and/or navigation forward/backward within the audio via use of the input mechanisms detailed herein. By way merely of example, a scratching down input could result in a command to lower the volume, slow the tempo or move/progress forward. Similarly, a scratching up input could result in a command to raise the volume, increase the tempo or move/progress backward (rewind).

Further, one aspect of the invention includes discovering a VoiLink on a voice site by hearing a tap whenever the Voilink is accessible. This 'tap' sound is generated by the voice site in the background whenever a Voilink is present. Also, in one embodiment of the invention, music is played by the Voicesite in the background to make the user aware of the period until the VoiLink is accessible. Alternatively, there can be a timeout associated with the tap; for example, a number of milliseconds after the tap when the Voilink is available to be accessed. This timeout will be a configurable attribute of any Voilink on a voice site. Accessing a VoiLink on a voice site could be accomplished via one of the input mechanisms described herein as well (for example, by tapping the instrument, before the timeout, to indicate the intention to access the link).

Additionally, in one aspect of the invention, an iterative input mechanism can be used as a command. For example, a user can tap on the phone instrument and the number of the taps determines the command being invoked on the server end (on the voice site). By way of example, one tap can indicate fast forward, two taps can indicate fast forward at double the speed, and so on. One embodiment of the invention also includes mapping haptic inputs (tapping, scratching, etc.) to traditional input modalities such as DTMF and speech for interoperability with all voice sites.

FIG. 1 is a diagram illustrating example haptic commands that can be given as input to a phone, translating to some control on a voice site on a server, according to an embodiment of the present invention. By way of illustration, FIG. 1 depicts a user listening to spoken web content in step 102 and hearing a Voilink cue generated in step 104. Additionally, step 106 includes tapping the phone to follow a link on the spoken web (for example, accessing the immediately preceding Voilink), and step 112 includes continuing to browse on the spoken web. Also, step 108 includes making a determination that a playback is occurring too slowly, step 110 includes scratching continuously to set the correct tempo of the playback and step 112 includes continuing to browse on the spoken web.

Figure 2:
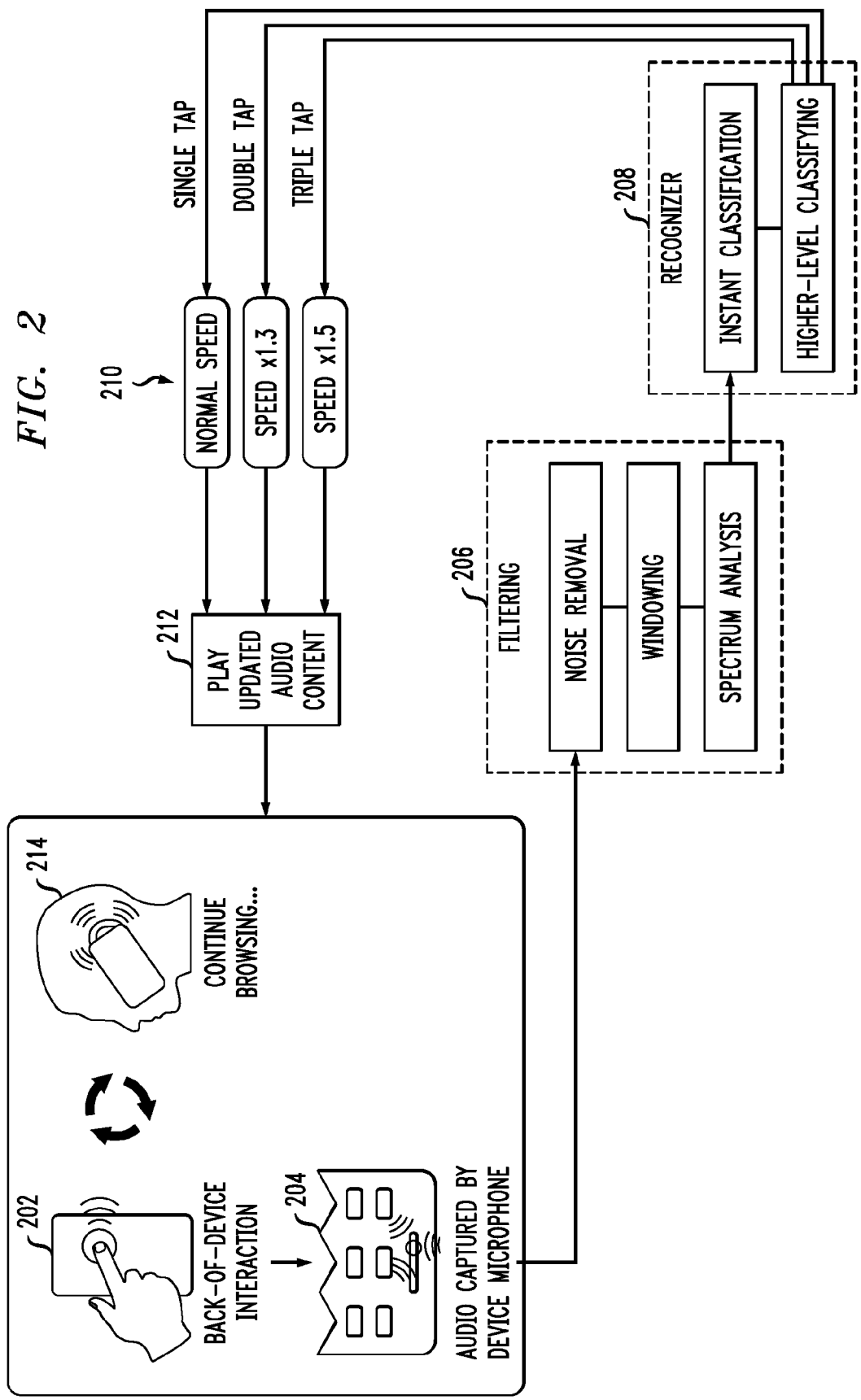
FIG. 2 is a process flow diagram illustrating an example embodiment, according to an aspect of the invention.

FIG. 2 is a process flow diagram illustrating an example embodiment, according to an aspect of the invention. Step 202 includes a user interaction with a phone device (for example, interacting with a component on the back-of-the-device). Step 204 includes capturing audio produced from the haptic input (such as tapping or scratching) by the device microphone, and the audio is sent out from the phone's microphone to a voice site server, specifically to a filtering module in step 206 and to a recognizer module in step 208. The filtering module performs noise removal, windowing and a spectrum analysis on the audio, and the recognizer module classifies the audio to determine if the audio is a valid haptic input (that is, an instant classification and/or a higher-level classification). After the validation/recognition, the audio input is processed to invoke the corresponding voice site command mapped for that haptic input in step 210. Additionally, step 212 includes playing the updated audio content and step 214 includes a continuation of the spoken web browsing.

Figure 3:
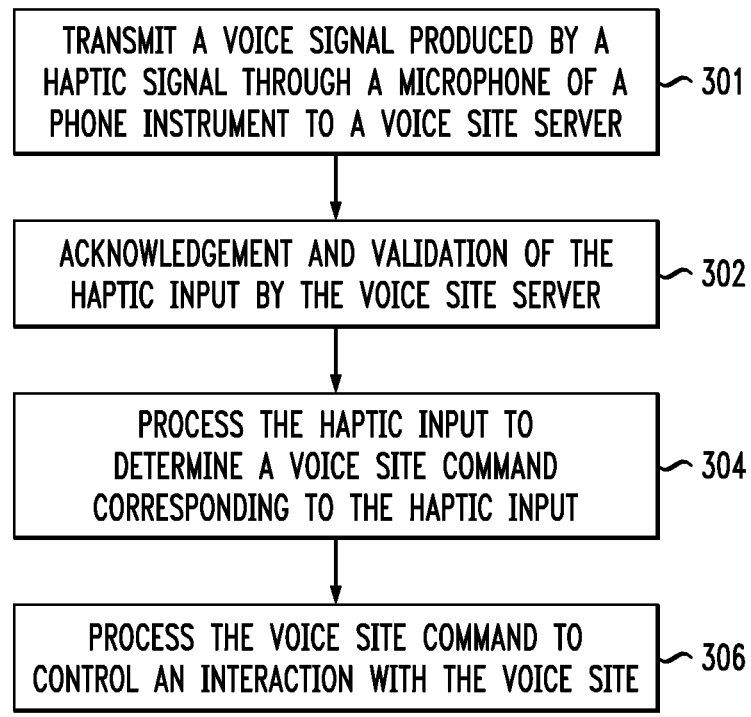
FIG. 3 is a flow diagram illustrating techniques for controlling a voice site using a haptic input modality, according to an embodiment of the invention.

FIG. 3 is a flow diagram illustrating techniques for controlling a voice site using a haptic input modality, according to an embodiment of the present invention. Step 301 includes transmitting the input audio/voice signal (produced by user's haptic input) to a voice site server via a microphone audio mechanism of a phone instrument. Step 302 includes acknowledging and validating the haptic input via the voice site server (that is, haptic input from an instrument capable of accessing a voice site). This step can be carried out, for example, using a filtering module and/or a recognizer module. As detailed herein, a haptic input modality can include a tap of a finger, a scratch by a finger, etc. Additionally, a haptic input modality can include an iterative haptic input modality.

Step 304 includes processing the haptic input to determine a voice site command corresponding to the haptic input. Processing the haptic input to determine a voice site command corresponding to the haptic input can include processing a scratching down input to identify a command of decreasing volume, decreasing tempo, and/or navigating forward. Processing the haptic input to determine a voice site command corresponding to the haptic input can also include processing a scratching up input to identify a command of increasing volume, increase tempo, and/or navigating backward. Additionally, processing the haptic input to determine a voice site command corresponding to the haptic input can include processing a tap input to identify a command of accessing a VoiLink on a voice site.

Step 306 includes processing the voice site command to control an interaction with the voice site. This step can be carried out, for example, by the voice server via calling the voice site command directly as a result of processing the haptic input.

The techniques depicted in FIG. 3 can additionally include discovering a VoiLink on a voice site via acknowledgement of an audio signal (such as a voice-site-generated 'tap' sound) when the Voilink is accessible (for example, to notify a user of a Voilink while content is being played). In one aspect of the invention, a time-limited audio is played in the background after a notification of the VoiLink to indicate a duration in which the user can access the Voilink. Further, an aspect of the invention also includes mapping a haptic input modality to one or more separate input modalities (such as DTMF/Speech) to achieve interoperability with a voice site. In this case, the voice server itself simulates a DTMF or Speech input based on the haptic command.

The techniques depicted in FIG. 3 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In one or more embodiments, the modules include a voice server, a filtering module, a recognizer module, and a Speech/DTMF recognizer module that can run, for example on one or more hardware processors. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 4:
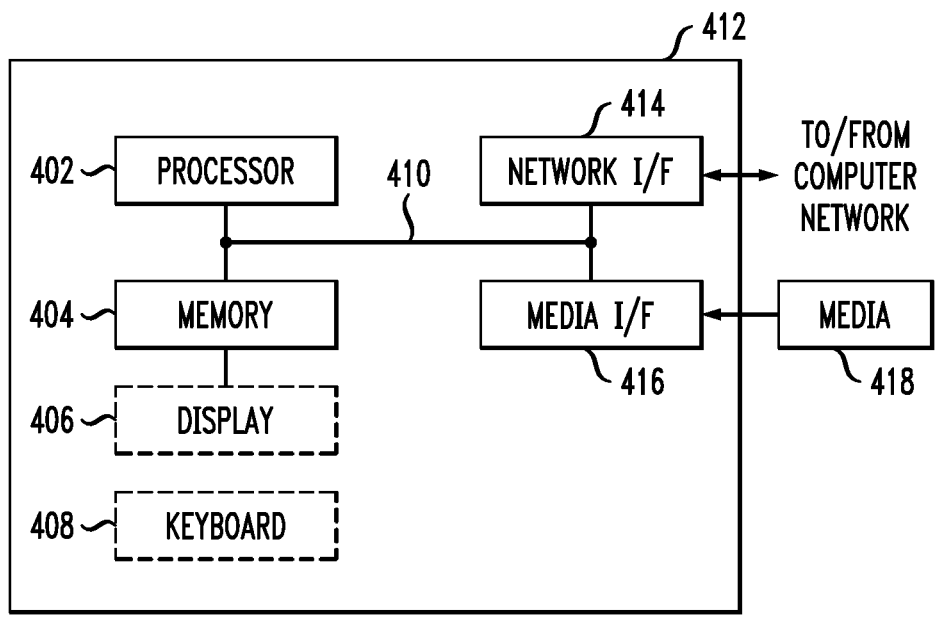
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in a computer readable medium having computer readable program code embodied thereon. Also, any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on one or more hardware processors 402. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, providing input mechanisms that are language independent.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An article of manufacture comprising a non-transitory computer readable storage medium having computer readable instructions tangibly embodied thereon which, when implemented, cause a computer to carry out a plurality of method steps comprising:
   validating a haptic input from an instrument capable of accessing a voice site, wherein the haptic input is an audio sound input, the instrument comprises a telephone device and the haptic input is transmitted exclusively via a voice channel, and wherein said validating comprises:
      (i) filtering the haptic input to remove noise from the haptic input;
      (ii) windowing the haptic input; and
      (iii) performing a spectrum analysis on the haptic input to facilitate classification of the haptic input as a valid haptic input;
   processing the haptic input on a server to determine a voice site command corresponding to the haptic input, comprising:
      processing a downward motion input to identify a command of navigating forward on the voice site;
      processing an upward motion input to identify a command of navigating backward on the voice site; and
      processing a tap input to identify a command of accessing a VoiLink on the voice site; and
   processing the voice site command at the server to control an interaction with the voice site.

2. The article of manufacture of claim 1, wherein a haptic input modality comprises a tap of a finger.

3. The article of manufacture of claim 1, wherein a haptic input modality comprises a scratch by a finger.

4. The article of manufacture of claim 1, wherein processing the haptic input to determine a voice site command corresponding to the haptic input comprises processing a scratching down input to identify a command of one of decreasing volume, and decreasing tempo.

5. The article of manufacture of claim 1, wherein processing the haptic input to determine a voice site command corresponding to the haptic input comprises processing a scratching up input to identify a command of one of increasing volume, and increase tempo.

6. The article of manufacture of claim 1, wherein the computer readable instructions which, when implemented, further cause a computer to carry out a method step comprising:
   mapping a haptic input modality to one or more separate input modalities to achieve interoperability with a voice site.

7. A System for controlling a voice site using a haptic input modality, comprising:
   at least one distinct software module, each distinct software module being embodied on a tangible computer-readable medium;
   a memory; and
   at least one processor coupled to the memory and operative for:
      validating a haptic input from an instrument capable of accessing a voice site, wherein the haptic input is an audio sound input, the instrument comprises a telephone device and the haptic input is transmitted exclusively via a voice channel, and wherein said validating comprises:
         (i) filtering the haptic input to remove noise from the haptic input;
         (ii) windowing the haptic input; and
         (iii) performing a spectrum analysis on the haptic input to facilitate classification of the haptic input as a valid haptic input;
      processing the haptic input on a server to determine a voice site command corresponding to the haptic input, comprising:
         processing a downward motion input to identify a command of navigating forward on the voice site;
         processing an upward motion input to identify a command of navigating backward on the voice site; and
         processing a tap input to identify a command of accessing a VoiLink on the voice site; and
      processing the voice site command at the server to control an interaction with the voice site.

8. The system of claim 7, wherein a haptic input modality comprises a tap of a finger.

9. The system of claim 7, wherein a haptic input modality comprises a scratch by a finger.

10. The system of claim 7, wherein the at least one processor coupled to the memory operative for processing the haptic input to determine a voice site command corresponding to the haptic input is further operative for processing a scratching down input to identify a command of one of decreasing volume, and decreasing tempo, and navigating.

11. The system of claim 7, wherein the at least one processor coupled to the memory operative for processing the haptic input to determine a voice site command corresponding to the haptic input is further operative for processing a scratching up input to identify a command of one of increasing volume, and increase tempo.

12. The system of claim 7, wherein the at least one processor coupled to the memory is further operative for:
   mapping a haptic input modality to one or more separate input modalities to achieve interoperability with a voice site.

* * * * *